United States Patent
He et al.

(10) Patent No.: US 12,436,205 B2
(45) Date of Patent: Oct. 7, 2025

(54) METHOD FOR DIAGNOSING TRANSFORMER FAULT BASED ON DEEP COUPLED DENSE CONVOLUTIONAL NEURAL NETWORK

(71) Applicants: WUHAN UNIVERSITY, Wuhan (CN); State Grid Tianjin Electric Power Company, Tianjin (CN)

(72) Inventors: Yigang He, Wuhan (CN); Zihao Li, Wuhan (CN); Jianfeng Wang, Wuhan (CN); Xiaoyu Liu, Wuhan (CN); Shiqian Ma, Wuhan (CN); Qingwu Gong, Wuhan (CN)

(73) Assignees: WUHAN UNIVERSITY, Wuhan (CN); State Grid Tianjin Electric Power Company, Tianjin (CN)

( * ) Notice: Subject to any disclaimer, the term of this patent is extended or adjusted under 35 U.S.C. 154(b) by 436 days.

(21) Appl. No.: 18/059,965

(22) Filed: Nov. 29, 2022

(65) Prior Publication Data
US 2023/0393219 A1 Dec. 7, 2023

(51) Int. Cl.
*G01R 31/62* (2020.01)
*G06N 3/045* (2023.01)
*G06N 3/0464* (2023.01)
*G06F 17/18* (2006.01)
*G06N 3/09* (2023.01)

(52) U.S. Cl.
CPC ............ *G01R 31/62* (2020.01); *G06N 3/045* (2023.01); *G06N 3/0464* (2023.01); *G06F 17/18* (2013.01); *G06N 3/09* (2023.01)

(58) Field of Classification Search
USPC ........................................................ 702/59
See application file for complete search history.

(56) References Cited

U.S. PATENT DOCUMENTS

| | | |
|---|---|---|
| 11,108,809 B2 | 8/2021 | Johns et al. |
| 11,126,171 B2 | 9/2021 | Cella et al. |
| 11,402,826 B2 | 8/2022 | Cella et al. |
| 2021/0020360 A1* | 1/2021 | He ............. G06N 7/01 |
| 2021/0048487 A1* | 2/2021 | He ............. G01R 31/62 |
| 2021/0089900 A1* | 3/2021 | He ............. G06N 3/045 |
| 2021/0279596 A1* | 9/2021 | Zheng ......... G06N 3/047 |
| 2023/0094389 A1* | 3/2023 | You ............. G06N 5/01 706/62 |

* cited by examiner

*Primary Examiner* — Paul D Lee
(74) *Attorney, Agent, or Firm* — True Shepherd LLC; Andrew C. Cheng

(57) ABSTRACT

A method for diagnosing transformer fault based on a deep coupled dense convolutional neural network, includes: obtaining datasets of dissolved gas in oil of a transformer in normal and fault states; expanding the datasets by using an adaptive synthetic oversampling method; performing, in a form of a two-dimensional matrix, feature reconstruction on characteristic gas dissolved in the oil; building a transformer fault diagnosis model based on a deep coupled dense convolutional neural network; and dividing an expanded dataset into a training set and a test set, and taking the two-dimensional matrix as an input of the deep coupled dense convolutional neural network and a set label as an output to train the network to obtain a fault diagnosis model. The present disclosure can resolve a problem that a fault diagnosis accuracy rate of the transformer is low due to insufficient and unbalanced fault samples in the dissolved gas in the oil.

5 Claims, 4 Drawing Sheets

METHOD FOR DIAGNOSING TRANSFORMER FAULT BASED ON DEEP COUPLED DENSE CONVOLUTIONAL NEURAL NETWORK

CROSS-REFERENCE TO RELATED APPLICATIONS

This application claims priority to Chinese Patent Application No. 202210638253.6 with a filing date of Jun. 7, 2022. The content of the aforementioned application, including any intervening amendments thereto, is incorporated herein by reference.

TECHNICAL FIELD

The present disclosure relates to the technical field of fault diagnosis of power transformers, and in particular, to a method for diagnosing transformer fault based on a deep coupled dense convolutional neural network.

BACKGROUND

A power transformer is a key device in a power transmission and transformation network, and its fault endangers safe and stable operation of an entire power system and causes a huge economic loss. Most of power transformers in service have exceeded an expected rated service life, because most of them were installed before 1980. In order to ensure reliable and effective operation of a transformer, real-time fault diagnosis of the transformer is particularly important. Dissolved gas-in-oil analysis (DGA) is an online monitoring technology. When a thermal fault or an electrical fault occurs on an oil immersed transformer, a content of dissolved gas in oil changes accordingly. A mutual relation between the content of the dissolved gas in the oil and a fault type of the transformer is studied to determine a health state of the transformer.

Traditional method for diagnosing transformer faults includes a ratio method and an image method. When a fault point falls on a boundary line, diagnosis of a fault type is very uncertain. Different diagnosis methods have different results, resulting in a low fault diagnosis accuracy rate. A series of artificial intelligence methods such as K-nearest neighbor, support vector machine, fuzzy theory, artificial neural network, deep belief network have been used to process DGA data. Some achievements have been made, but there are still shortcomings in a learning ability, processing efficiency, feature extraction, and the like. In recent years, different from a previous alternative method, a deep learning method has been applied more robustly and effectively. A convolutional neural network has been relatively mature in visual recognition, image processing, and fault diagnosis.

The dissolved gas in the oil uses five kinds of characteristic gas (H2, CH4, C2H6, C2H4, and C2H2) as characteristic quantities. If only a few characteristic quantities are input, and data is unbalanced, a deep convolutional neural network is prone to overfitting. There are still some difficulties in applying a deep learning technology to fault diagnosis of a transformer with dissolved gas in oil: 1) There are only a few and unbalanced transformer datasets. 2) There are only a little characteristic gas, in other words, there are only a few characteristics at an input end. 3) A network training process is prone to overfitting, and oscillation occurs in the training process.

SUMMARY

The technical issue to be resolved in the present disclosure is to provide a method for diagnosing transformer fault based on a deep coupled dense convolutional neural network to overcome the defects in the prior art.

The present disclosure resolves the technical issue with the following technical solution:

The present disclosure provides a method for diagnosing transformer fault based on a deep coupled dense convolutional neural network, including the following steps:

step 1: obtaining datasets of dissolved gas in oil of a transformer in normal and fault states, normalizing the datasets of the dissolved gas in the oil, and setting a label;

step 2: expanding the obtained datasets of the dissolved gas in the oil in step 1 by using an adaptive synthetic oversampling method, to form a new dataset;

step 3: performing, in a form of a two-dimensional matrix, feature reconstruction on characteristic gas dissolved in the oil;

step 4: building a transformer fault diagnosis model based on a deep coupled dense convolutional neural network; and step 5: dividing the new expanded dataset in step 2 into a training set and a test set, taking the two-dimensional matrix in step 3 as an input of the deep coupled dense convolutional neural network and the set label in step 1 as an output to train the deep coupled dense convolutional neural network, and calculating an accuracy rate based on the test set to obtain a trained transformer fault diagnosis model.

Further, step 1 in the present disclosure includes:
obtaining the dataset of the dissolved gas in the oil according to the following formula:

$$\text{sample}i = \{x_{i,1}, x_{i,2}, \ldots, x_{i,j}, y_i\} i \in [1, N]$$

where samplei represents data of the dissolved gas in the oil in an $i^{th}$ sample, and there are N data samples in total; $x_{i,j}$ represents a content of $j^{th}$ characteristic gas in the $i^{th}$ sample; and $y_i$ represents a state of the transformer in the $i^{th}$ sample; performing normalization according to the following formula:

$$X'_{i,j} = \frac{X_{i,j}}{\sum_{j=0} X_{i,j}}$$

setting the label for the state of the transformer in a form of a numerical serial number.

Further, the adaptive synthetic oversampling method in step 2 in the present disclosure includes:

(1) assuming that a quantity of samples to be synthesized for a minority-class sample is G, and for each minority-class sample samplei, finding K adjacent samples by using a Euclidean distance formula in n-dimensional space:

$$d = \sqrt{\sum_{j=1}^{n}(x_{Aj} - x_{Bj})^2}$$

where $x_{Aj}$ represents a content of $j^{th}$ characteristic gas of sample point A, $x_{Bj}$ represents a content of $j^{th}$ characteristic gas of sample point B, and d represents a Euclidean distance between sample point A and sample point B;

(2) calculating a proportion of majority-class samples among the found K adjacent samples;

$$r_i = \Delta_i / K$$

where K represents a quantity of adjacent samples, $\Delta_i$ represents a quantity of majority-class samples adjacent to an $i^{th}$ sample, and $r_i$ represents a proportion of the majority-class samples adjacent to the $i^{th}$ sample;

(3) calculating a quantity of samples to be synthesized for each minority-class sample samplei:

$$g_i = \frac{r_i}{\sum_i r_i} \times G$$

where G represents the total quantity of samples to be synthesized for the minority-class sample, and $g_i$ represents a quantity of samples to be synthesized for the $i^{th}$ sample;

(4) selecting a minority-class sample randomly from the K adjacent samples of each minority-class sample samplei to generate a synthetic data sample:

$$s_i = x_i + (x_{zi} - x_i) \times \lambda$$

where $x_i$ represents the $i^{th}$ data sample, $\lambda$ represents a random number, and $s_i$ represents a new data sample generated for the $i^{th}$ sample; and performing the above steps to expand the dataset to make datasets in various fault states more balanced.

Further, step 3 in the present disclosure includes:

constructing a content of the characteristic gas in a form of one-dimensional matrix into the two-dimensional matrix through permutation and combination, so as to increase characteristic quantities, and comprehensively considering a relationship between each gas content change and the fault state.

Further, step 4 in the present disclosure includes:

fusing, by the deep coupled dense convolutional neural network, values calculated by two previous convolutional layers in a depth direction, to serve as an input value of a next convolutional layer:

$$x_m = F_m([x_{m-2}, x_{m-1}])$$

where $x_m$ represents an input value of a network at an $m^{th}$ layer, namely, an output value of a network at an $(m-1)^{th}$ layer, and $F_m$ represents a calculation function of the $m^{th}$ layer;

the calculation function mainly includes five basic calculation processes: convolution calculation, standardization, activation functions, pooling, and discarding;

a simplified formula of the convolution calculation is as follows:

$$y = \Sigma WX + b$$

where x represents an input value, w represents a weight, b represents an offset, and y represents an output;

the standardization is capable of making data conform to a standard normal distribution with an average value of 0 and a standard deviation of 1; the activation functions mainly include a relu function, a tanh function, and a softmax function; and the convolutional layer uses the relu function, a fully connected layer uses the tanh function, and an output layer uses the softmax function;

$$Relu\ f(x) = \max(0, x)$$

$$Than\ f(x) = \frac{e^x - e^{-x}}{e^x + e^{-x}}$$

$$softmax\ f(x) = \frac{e^{xi}}{\sum_{i=0}^{n} e^{xi}}$$

where x represents an input value of the layer, and f(x) represents an output value of the layer; and the pooling is capable of reducing an amount of characteristic data in a convolutional neural network, and mainly includes maximum pooling and average pooling; and a discarding layer is mainly used to discard some neurons, so as to effectively prevent overfitting of the convolutional neural network.

Further, the transformer fault diagnosis model in step 4 in the present disclosure is specifically as follows:

the building of the transformer fault diagnosis model is a design process of the deep coupled dense convolutional neural network, including two parts: setting a quantity of convolutional layers in a coupled dense module, and setting a quantity of coupled dense modules in the deep coupled dense convolutional neural network; where (1) the setting a quantity of convolutional layers in a coupled dense module includes: setting a quantity of the coupled dense module to 1, changing a quantity of convolutional layers in the module from 2 to 6, building a network model, placing the dataset into the network for training, comparing accuracy rates of test sets in the case of different quantities of convolutional layers in the module, and selecting a quantity of convolutional layers that corresponds to a highest accuracy rate; and (2) the setting a quantity of coupled dense modules in the deep coupled dense convolutional neural network includes: setting the quantity of convolutional layers in the module as the quantity of convolutional layers that is obtained in step (1), changing the quantity of modules in the whole network from 1 to 4, building a corresponding network model, placing a sample into the network for training, comparing accuracy rates of test sets in the case of different quantities of modules, and selecting a quantity of modules that corresponds to a highest accuracy rate.

Further, step 5 in the present disclosure includes:

dividing the new dataset into the training set and the test set in a proportion of 4:1;

taking the two-dimensional matrix in step 3 as the input of the deep coupled dense convolutional neural network and the set label in step 1 as the output to train the network; and taking a loss function and a fault diagnosis accuracy rate as reference standards; and $$loss = -\frac{1}{n} \sum_x [y \ln a + (1 - y) \ln(1 - a)]$$

$$accuracy = \frac{sum(y_{test} = y_{pred})}{numble(y_{test})} \times 100\%$$

performing training by using an Adam algorithm, such that the deep coupled dense convolutional neural network performs iteration and modifies a parameter value continuously, and calculating the loss function and the accuracy rate based on the test set to obtain the trained transformer fault diagnosis model.

The present disclosure achieves the following beneficial effects: The method for diagnosing transformer fault based on a deep coupled dense convolutional neural network in the present disclosure can resolve a problem that a fault diagnosis accuracy rate of the transformer based on the deep convolutional neural network is low due to insufficient and unbalanced fault samples in the dissolved gas in the oil and few characteristic quantities. Considering a mutual relation between the characteristic gas and the fault state comprehensively, the present disclosure provides a method for building the deep dense convolutional neural network to effectively alleviate oscillation and overfitting in a training process.

BRIEF DESCRIPTION OF THE DRAWINGS

The present disclosure is described in further detail with reference to the accompanying drawings and embodiments.

DETAILED DESCRIPTION OF THE EMBODIMENTS

To make the objectives, technical solutions, and advantages of the present disclosure clearer, the present disclosure is further described below in detail with reference to the accompanying drawings and embodiments. It should be understood that the specific embodiments described herein are merely intended to explain the present disclosure, rather than to limit the present disclosure. All other embodiments obtained by those of ordinary skill in the art based on the embodiments of the present disclosure without creative efforts shall fall within the protection scope of the present disclosure.

Figure 1:
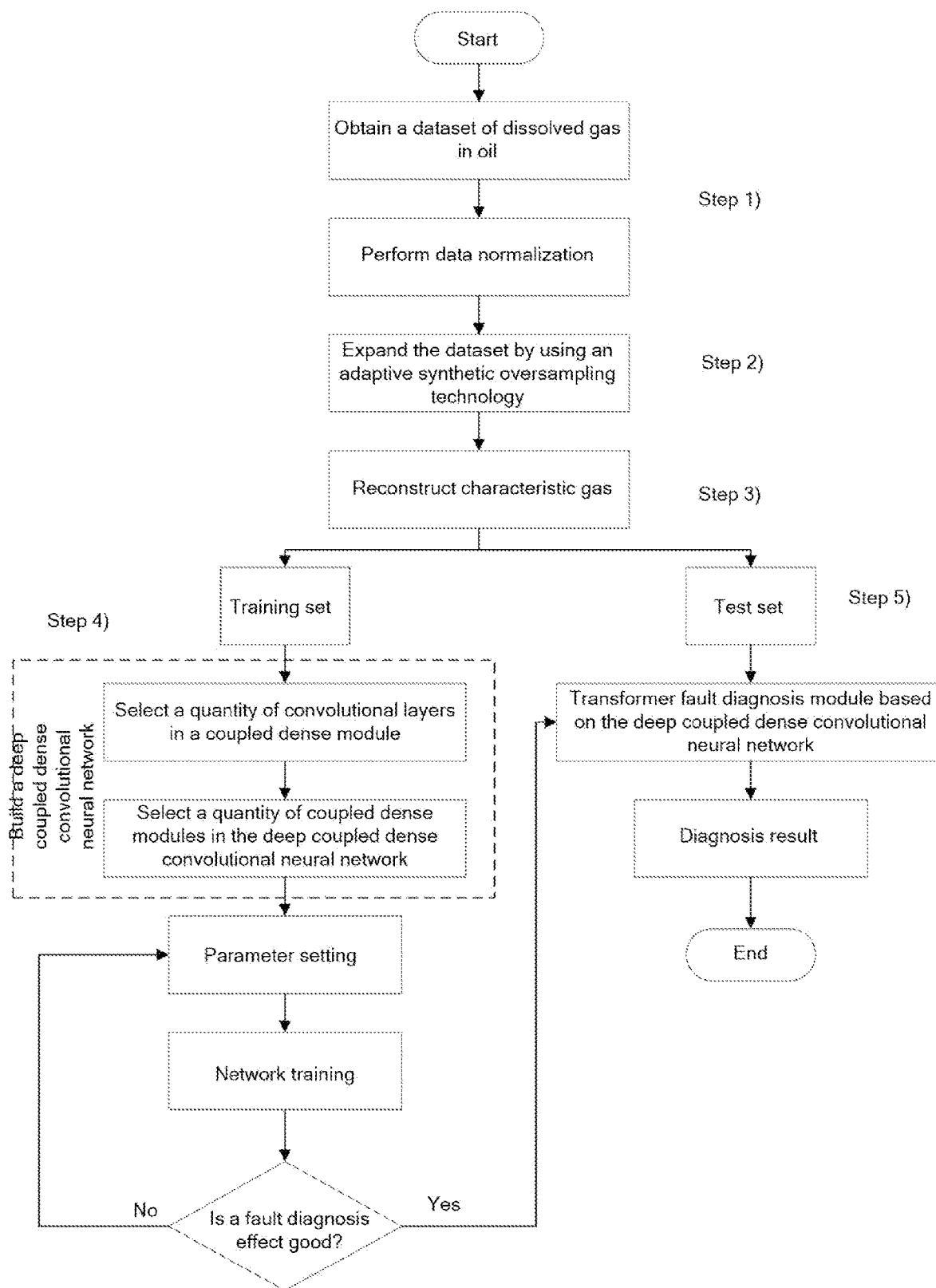
FIG. 1 is a flowchart of a method according to the present disclosure.

FIG. 1 is a flowchart of a method for diagnosing transformer fault based on a deep coupled dense convolutional neural network according to an embodiment of the present disclosure. Implementation steps are as follows:

Step 1: Obtain datasets of dissolved gas in oil of a transformer in normal and fault states, normalize the datasets, and set a label.

Datasets of dissolved gas in oil of each substation in the normal and fault states are collected from relevant literature over the years and actual test data of electric power companies. Each group of data includes five kinds of characteristic gas: hydrogen (H2), methane (CH4), ethane (C2H6), ethylene (C2H4), and acetylene (C2H2), and a state of the transformer.

The dataset of the dissolved gas in the oil in step 1 is as follows:

$$sample i = \{x_{i,1}, x_{i,2}, \ldots, x_{i,j}, y_i\} i \in [1, N]$$

where samplei represents data of the dissolved gas in the oil in an $i^{th}$ sample, and there are N data samples in total; $x_{i,j}$ represents a content of $j^{th}$ characteristic gas in the $i^{th}$ sample; and $y_i$ represents a state of the transformer in the $i^{th}$ sample.

In step 1, normalization is performed according to the following formula:

$$X'_{i,j} = \frac{X_{i,j}}{\sum_{j=0} X_{i,j}}$$

In step 1, the label is set for the state of the transformer in a form of a numerical serial number. The transformer has a total of seven states: normal state, low-temperature overheating, mid-temperature overheating, high-temperature overheating, partial discharge, low-energy discharge, and high-energy discharge. Labels for the normal state, low-temperature overheating, mid-temperature overheating, high-temperature overheating, partial discharge, low-energy discharge, and high-energy discharge are defined as 0, 1, 2, 3, 4, 5, and 6 respectively. A quantity of samples collected in each state is shown in Table 1.

TABLE 1

Data distribution in the relevant literature over the years and actual tests of the electric power companies

| Transformer state (label) | Quantity of samples |
| --- | --- |
| Normal state (0) | 113 |
| Low-temperature overheating (1) | 39 |
| Mid-temperature overheating (2) | 76 |
| High-temperature overheating (3) | 309 |
| Partial discharge (4) | 64 |
| Low-energy discharge (5) | 163 |
| High-energy discharge (6) | 286 |
| Total | 1050 |

Step 2: Expand the obtained datasets in step 1 by using an adaptive synthetic oversampling technology, to form a new dataset.

A calculation process of the adaptive synthetic oversampling technology in step 2 may include:

(1) assuming that a quantity of samples to be synthesized for a minority-class sample is G, and for each minority-class sample samplei, finding K adjacent samples by using a Euclidean distance formula in n-dimensional space:

$$d = \sqrt{\sum_{j=1}^{n} (x_{Aj} - x_{Bj})^2}$$

where $x_{Aj}$ represents a content of $j^{th}$ characteristic gas of sample point A, $x_{Bj}$ represents a content of $j^{th}$ characteristic gas of sample point B, and d represents a Euclidean distance between sample point A and sample point B;

(2) calculating a proportion of majority-class samples among the found K adjacent samples;

$$r_i = \Delta_i / K$$

where K represents a quantity of adjacent samples, $\Delta_i$ represents a quantity of majority-class samples adjacent to an $i^{th}$ sample, and $r_i$ represents a proportion of the majority-class samples adjacent to the $i^{th}$ sample;

(3) calculating a quantity of samples to be synthesized for each minority-class sample samplei:

$$g_i = \frac{r_i}{\sum_i r_i} \times G$$

where G represents the total quantity of samples to be synthesized for the minority-class sample, and $g_i$ represents a quantity of samples to be synthesized for the $i^{th}$ sample;

(4) selecting a minority-class sample randomly from the K adjacent samples of each minority-class sample samplei to generate a synthetic data sample:

$$s_i = x_i + (x_{zi} - x_i) \times \lambda$$

where $x_i$ represents the $i^{th}$ data sample, $\lambda$ represents a random number, and $s_i$ represents a new data sample generated for the $i^{th}$ sample; and performing the above steps to expand the dataset to make datasets in various fault states more balanced, where a quantity of samples in each state after expansion is shown in Table 2.

TABLE 2

Data distribution obtained through expansion by using the adaptive synthetic oversampling technology

| Transformer state (label) | Quantity of samples |
|---|---|
| Normal state (0) | 303 |
| Low-temperature overheating (1) | 305 |
| Mid-temperature overheating (2) | 309 |
| High-temperature overheating (3) | 309 |
| Partial discharge (4) | 298 |
| Low-energy discharge (5) | 301 |
| High-energy discharge (6) | 286 |
| Total | 2111 |

Step 3: Perform, in a form of a two-dimensional matrix, feature reconstruction on characteristic gas dissolved in the oil.

The feature reconstruction in step 3 is to construct a content of the characteristic gas in a form of one-dimensional matrix into the two-dimensional matrix through permutation and combination, so as to increase characteristic quantities, and comprehensively considering a relationship between each gas content change and the fault state.

Figure 2:
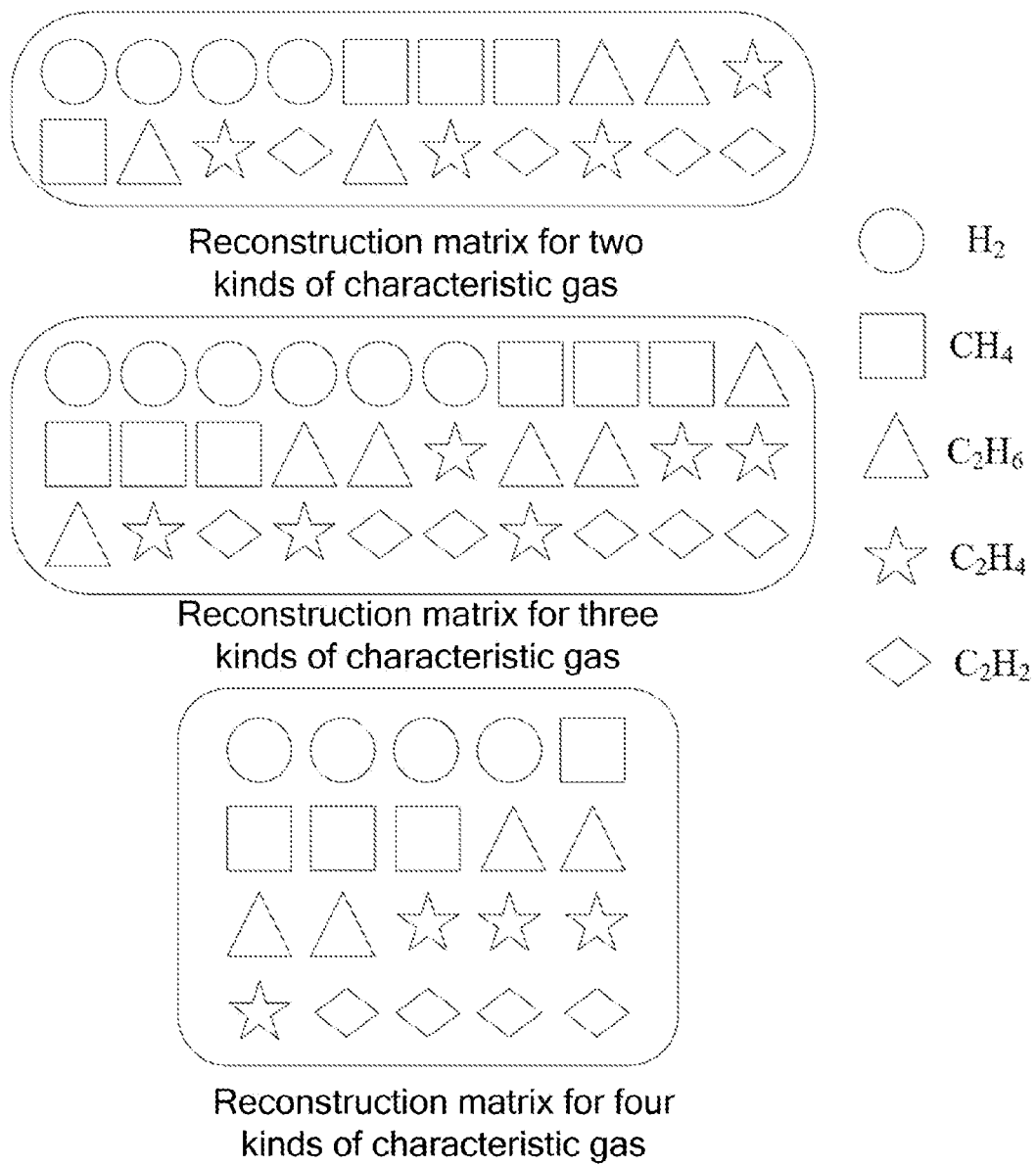
FIG. 2 is a schematic diagram of reconstructing characteristic gas according to the present disclosure.

The one-dimensional matrix composed of the five kinds of characteristic gas is constructed into the two-dimensional matrix through permutation and combination. When two kinds of characteristic gas are used, there are a total of 10 combination modes, such that a 2*10 two-dimensional matrix is formed, and so on. A 3*10 two-dimensional matrix is constructed for three kinds of characteristic gas, and a 4*5 two-dimensional matrix is constructed for four kinds of characteristic gas, as shown in FIG. 2. Characteristic relationships between two kinds of gas, between three kinds of gas, and between four kinds of gas are proposed by setting a convolution kernel in step 4.

Step 4: Build a transformer fault diagnosis model based on a deep coupled dense convolutional neural network.

Figure 3:
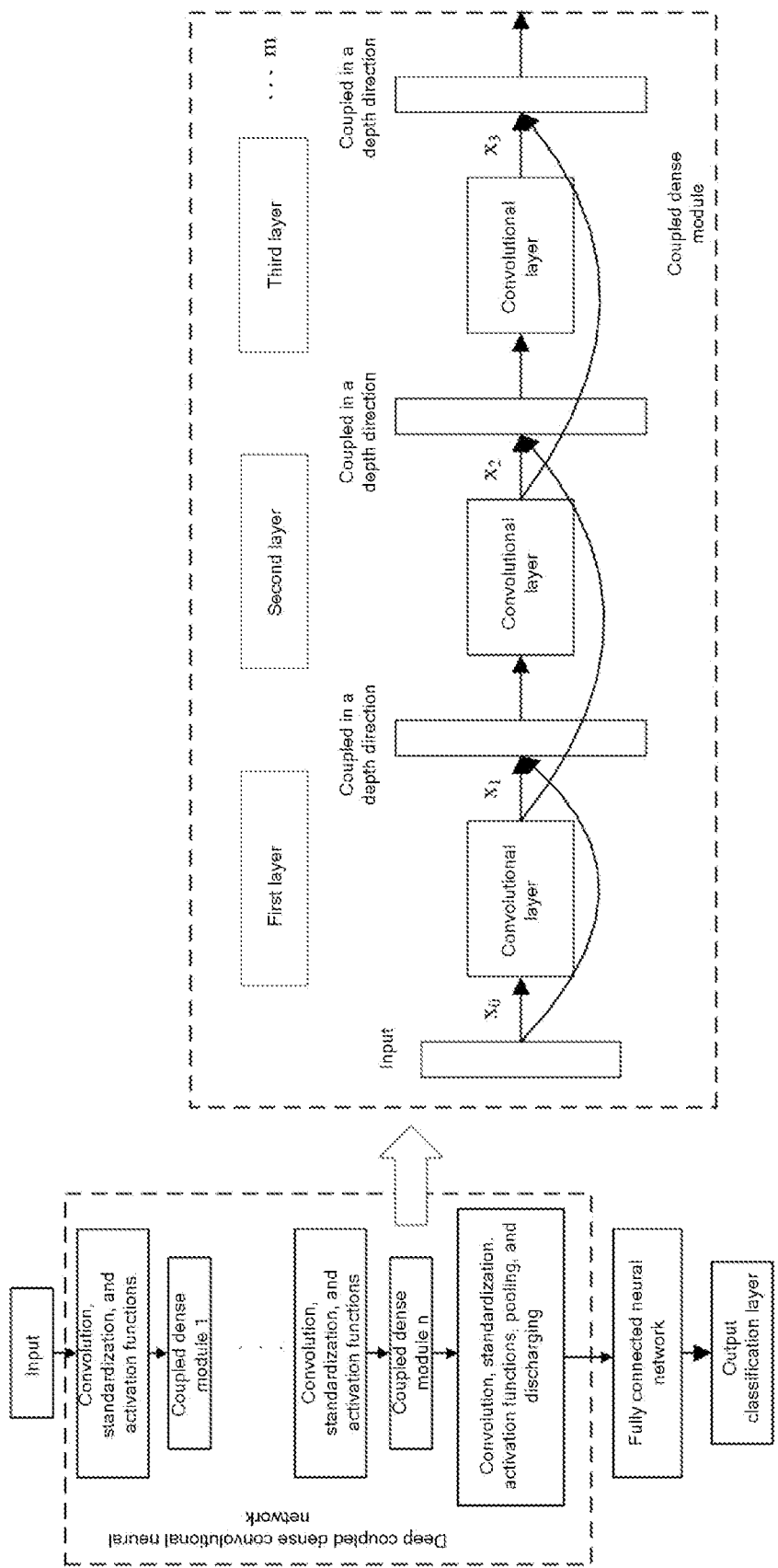
FIG. 3 is a schematic diagram of a deep coupled dense convolutional neural network according to the present disclosure.

The deep coupled dense convolutional neural network in step 4 fuses values calculated by two previous convolutional layers in a depth direction, to serve as an input value of a next convolutional layer as shown in FIG. 3.

$$x_m = F_m([x_{m-2}, x_{m-1}])$$

In the above formula, $x_m$ represents an input value of a network at an $m^{th}$ layer, namely, an output value of a network at an $(m-1)^{th}$ layer, and $F_m$ represents a calculation function of the $m^{th}$ layer.

The calculation function mainly includes five basic calculation processes: convolution calculation, standardization, activation functions, pooling, and discarding.

A simplified formula of the convolution calculation is as follows:

$$y = \Sigma W X + b$$

where x represents an input value, w represents a weight, b represents an offset, and y represents an output.

The standardization is capable of making data conform to a standard normal distribution with an average value of 0 and a standard deviation of 1. The activation functions mainly include a relu function, a tanh function, and a softmax function. The convolutional layer uses the relu function, a fully connected layer uses the tanh function, and an output layer uses the softmax function.

$$Relu\ f(x) = \max(0, x)$$

$$Than\ f(x) = \frac{e^x - e^{-x}}{e^x + e^{-x}}$$

$$softmax\ f(x) = \frac{e^{xi}}{\sum_{i=0}^{n} e^{xi}}$$

In the above formula, x represents an input value of the layer, and f(x) represents an output value of the layer.

The pooling can reduce an amount of characteristic data in a convolutional neural network, and mainly includes maximum pooling and average pooling. A discarding layer is mainly used to discard some neurons, so as to effectively prevent overfitting of the convolutional neural network.

The building of the transformer fault diagnosis model in step 4 is a design process of the deep coupled dense convolutional neural network, mainly including two parts: setting a quantity of convolutional layers in a coupled dense module, and setting a quantity of coupled dense modules in the deep coupled dense convolutional neural network.

(1) The setting a quantity of convolutional layers in a coupled dense module includes: setting a quantity of coupled dense modules to 1, name, n=1 in FIG. 3, changing a quantity of convolutional layers in the module (from 2 to 6), namely, m=2,3,4,5, 6 in FIG. 3, building a network model, placing the dataset into the network for training, comparing accuracy rates of test sets in the case of different quantities of convolutional layers in the module, and selecting a quantity of convolutional layers that corresponds to a highest accuracy rate.

(2) The setting a quantity of coupled dense modules in the deep coupled dense convolutional neural network includes: setting the quantity of convolutional layers in the module as the quantity of convolutional layers that is obtained in step (1), changing the quantity of modules in the whole network (from 1 to 4), namely, n=1, 2, 3, 4 in FIG. 3, building a corresponding network model, placing a sample into the network for training, comparing accuracy rates of test sets in the case of different quantities of modules, and selecting a quantity of modules that corresponds to a highest accuracy rate.

Step 5: Divide the expanded dataset in step 2 into a training set and a test set, take the two-dimensional matrix in step 3 as an input of the deep coupled dense convolutional neural network and the set label in step 1 as an output to train the network to obtain a transformer fault diagnosis model with a high accuracy rate of the test set.

The dataset in step 5 is divided into the training set and the test set in a proportion of 4:1.

Figure 4:
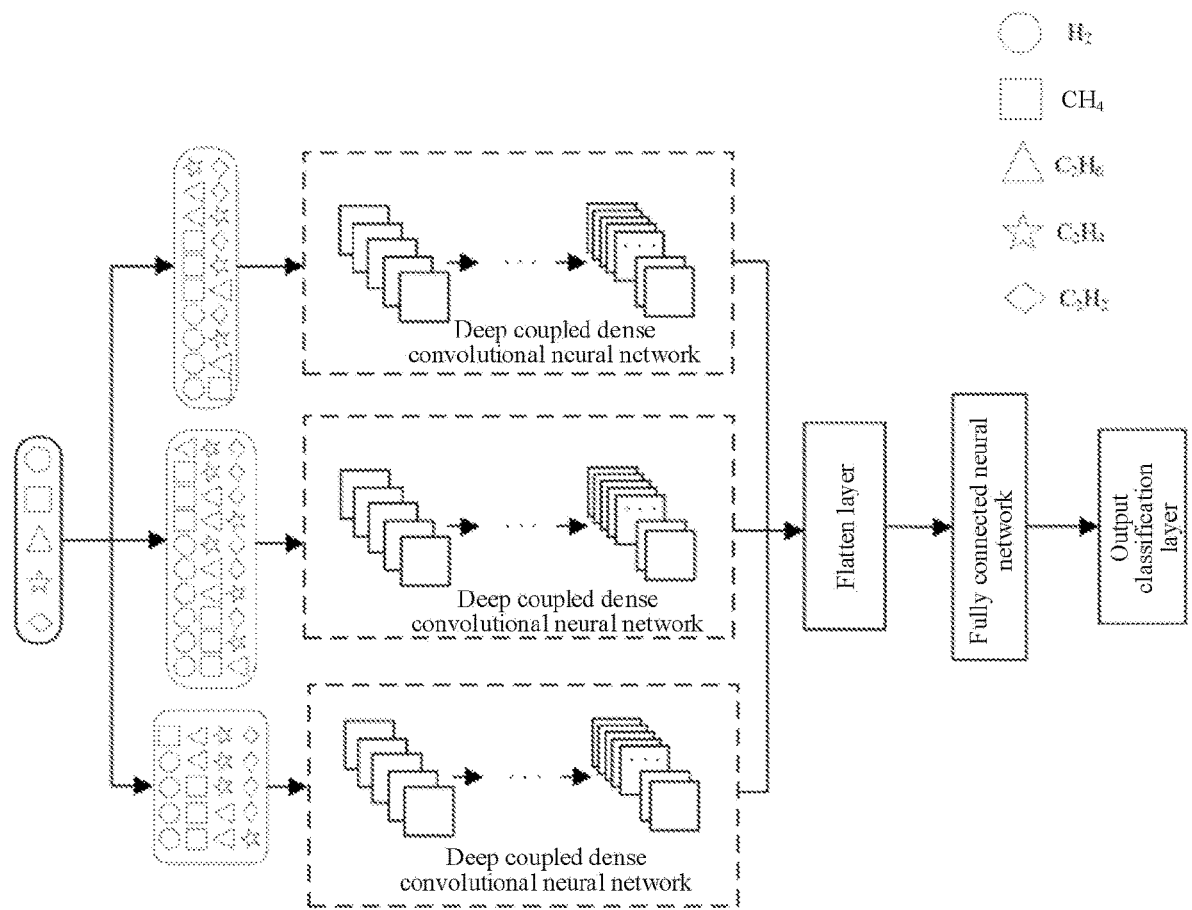
FIG. 4 illustrates an overall framework of a transformer fault diagnosis model according to the present disclosure.

As described in step 5, three two-dimensional matrices in step 3 are used as inputs of the deep coupled dense convolutional neural network, and are input into their corresponding deep coupled dense convolutional neural networks, and feature data obtained is flattened into one-dimensional data by using a flatten layer, and the one-dimensional data is input into the subsequent fully connected layer. The output layer uses the softmax function. The label set in step 1 is used as the output to train the network. An overall network architecture is shown in FIG. 4. A loss function and a fault diagnosis accuracy rate are taken as reference standards.

$$\text{loss} = -\frac{1}{n}\sum_x [y \ln a + (1-y)\ln(1-a)]$$

$$\text{accuracy} = \frac{\text{sum}(y_{test} = y_{pred})}{numble(y_{test})} \times 100\%$$

An Adam algorithm is used in a training process. 512 pieces of data are put for iteration each time, such that the deep coupled dense convolutional neural network performs iteration and modifies a parameter value continuously, to obtain the transformer fault diagnosis model in which the training set and the test set have a small loss function and a high accuracy rate. According to step 5, data of dissolved gas in the oil of the transformer in the test set is input, and a final diagnosis accuracy rate is 94.05%.

In conclusion, the present disclosure realizes diagnosis of the fault state of the transformer. The adaptive synthetic oversampling technology makes fault sample data of the transformer more sufficient and balanced. The reconstruction of the characteristic gas increases the characteristic quantities, and comprehensively considers a mutual relation between each kind of gas and the transformer state. The transformer fault diagnosis model based on the deep coupled dense convolutional neural network can achieve a high fault diagnosis accuracy rate.

It should be understood that those of ordinary skill in the art can make improvements or transformations based on the above description, and all these improvements and transformations should fall within the protection scope of the appended claims of the present disclosure.

What is claimed is:

1. A method for diagnosing a transformer fault based on a deep coupled dense convolutional neural network, comprising the following steps:

step 1: obtaining datasets of dissolved gas in oil of a transformer in normal and fault states, normalizing the datasets of the dissolved gas in the oil, and setting a label;

step 2: expanding the obtained datasets of the dissolved gas in the oil in step 1 by using an adaptive synthetic oversampling method, to form a new dataset;

step 3: performing, in a form of a two-dimensional matrix, feature reconstruction on characteristic gas dissolved in the oil;

step 4: building a transformer fault diagnosis model based on a deep coupled dense convolutional neural network; and step 5: dividing the new expanded dataset in step 2 into a training set and a test set, taking the two-dimensional matrix in step 3 as an input of the deep coupled dense convolutional neural network and the set label in step 1 as an output to train the deep coupled dense convolutional neural network, and calculating an accuracy rate based on the test set to obtain a trained transformer fault diagnosis model;

wherein: the transformer fault diagnosis model in step 4 comprises a quantity of coupled dense modules; the coupled dense modules comprise a quantity of convolutional layers; the number of coupled dense modules is 1 to 4; the number of convolutional layers is 2 to 6;

the coupled dense modules are configured to train a sample and measurement accuracy rate of test sets; the convolutional layers are configured to train the dataset and measurement accuracy rate of test sets;

the transformer fault diagnosis model is configured to fuse values calculated by two previous convolutional layers in a depth direction as the input value of a next convolutional layer:

$$x_m = F_m([x_{m-2}, x_{m-1}])$$

wherein $x_m$ represents an input value of a network at an $m^{th}$ layer, namely, an output value of a network at an $(m-1)^{th}$ layer, and $F_m$ represents a calculation function of the $m^{th}$ layer;

the calculation function mainly comprises five basic calculation processes: convolution calculation, standardization, activation functions, pooling, and discarding;

a simplified formula of the convolution calculation is as follows:

$$y = \Sigma WX + b$$

wherein x represents an input value, w represents a weight, b represents an offset, and y represents an output;

the standardization is configured to making data conform to a standard normal distribution with an average value of 0 and a standard deviation of 1; the activation functions mainly comprise a Relu function, a Tanh function, and a softmax function; and the convolutional layer uses the relu function, a fully connected layer uses the tanh function, and an output layer uses the softmax function;

$$Relu\ f(x) = \max(0, x)$$

$$Than\ f(x) = \frac{e^x - e^{-x}}{e^x + e^{-x}}$$

$$softmax\ f(x) = \frac{e^{xi}}{\sum_{i=0}^{n} e^{xi}}$$

wherein x represents an input value of the layer, and f(x) represents an output value of the layer; and the pooling is configured to reducing an amount of characteristic data in a convolutional neural network, and mainly comprises maximum pooling and average pooling; and a discarding layer is mainly used to discard some neurons, so as to effectively prevent overfitting of the convolutional neural network.

2. The method according to claim 1, wherein step 1 comprises:
obtaining the dataset of the dissolved gas in the oil according to the following formula:

$$\text{sample}i = \{x_{i,1}, x_{i,2}, \ldots, x_{i,j}, y_i\} i \in [1, N]$$

wherein samplei represents data of the dissolved gas in the oil in an $i^{th}$ sample, and there are N data samples in total; $x_{i,j}$ represents a content of $j^{th}$ characteristic gas in the $i^{th}$ sample; and $y_i$ represents a state of the transformer in the $i^{th}$ sample;
performing normalization according to the following formula:

$$X'_{i,j} = \frac{X_{i,j}}{\sum_{j=0} X_{i,j}}$$

setting the label for the state of the transformer in a form of a numerical serial number.

3. The method according to claim 1, wherein the adaptive synthetic oversampling method in step 2 comprises:
(1) assuming that a quantity of samples to be synthesized for a minority-class sample is G, and for each minority-class sample samplei, finding K adjacent samples by using a Euclidean distance formula in n-dimensional space:

$$d = \sqrt{\sum_{j=1}^{n}(x_{Aj} - x_{Bj})^2}$$

wherein $x_{Aj}$ represents a content of $j^{th}$ characteristic gas of sample point A, $x_{Bj}$ represents a content of $j^{th}$ characteristic gas of sample point B, and d represents a Euclidean distance between sample point A and sample point B;
(2) calculating a proportion of majority-class samples among the found K adjacent samples;

$$r_i = \Delta_i / K$$

wherein K represents a quantity of adjacent samples, $\Delta_i$ represents a quantity of majority-class samples adjacent to an $i^{th}$ sample, and $r_i$ represents a proportion of the majority-class samples adjacent to the $i^{th}$ sample;

(3) calculating a quantity of samples to be synthesized for each minority-class sample samplei:

$$g_i = \frac{r_i}{\sum_i r_i} \times G$$

wherein G represents the total quantity of samples to be synthesized for the minority-class sample, and $g_i$ represents a quantity of samples to be synthesized for the $i^{th}$ sample;
(4) selecting a minority-class sample $x_{zi}$ randomly from the K adjacent samples of each minority-class sample samplei to generate a synthetic data sample:

$$s_i = x_i + (x_{zi} - x_i) \times \lambda$$

wherein $x_i$ represents the $i^{th}$ sample, $\lambda$ represents a random number, and $s_i$ represents a new data sample generated for the $i^{th}$ sample; and
performing the above steps to expand the dataset to make datasets in various fault states more balanced.

4. The method according to claim 1, wherein step 3 comprises:
constructing a content of the characteristic gas in a form of a one-dimensional matrix into the two-dimensional matrix through permutation and combination, so as to increase characteristic quantities, and comprehensively considering a relationship between each gas content change and the fault state.

5. The method according to claim 1, wherein step 5 comprises:
dividing the new dataset into the training set and the test set in a proportion of 4:1;
taking the two-dimensional matrix in step 3 as the input of the deep coupled dense convolutional neural network and the set label in step 1 as the output to train the network; and taking a loss function and a fault diagnosis accuracy rate as reference standards; and
performing training by using an Adam algorithm, such that the deep coupled dense convolutional neural network performs iteration and modifies a parameter value continuously, and calculating the loss function and the accuracy rate based on the test set to obtain the trained transformer fault diagnosis model.

* * * * *